United States Patent
Aruga et al.

(10) Patent No.: US 9,250,501 B2
(45) Date of Patent: Feb. 2, 2016

(54) PROJECTION SYSTEM AND PROJECTOR

(71) Applicant: SEIKO EPSON CORPORATION, Tokyo (JP)

(72) Inventors: Tadanori Aruga, Torrance, CA (US); Yutaka Yasuda, Matsumoto (JP); Toru Katahira, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 282 days.

(21) Appl. No.: 13/905,481

(22) Filed: May 30, 2013

(65) Prior Publication Data

US 2013/0329196 A1    Dec. 12, 2013

(30) Foreign Application Priority Data

Jun. 6, 2012    (JP) .................. 2012-128677

(51) Int. Cl.
   - *G03B 21/14* (2006.01)
   - *G03B 21/13* (2006.01)
   - *H04N 9/31* (2006.01)

(52) U.S. Cl.
   CPC .............. *G03B 21/147* (2013.01); *G03B 21/13* (2013.01); *H04N 9/317* (2013.01); *H04N 9/3147* (2013.01); *H04N 9/3185* (2013.01)

(58) Field of Classification Search
   USPC ........... 353/30, 69, 70, 94; 345/2.2, 4, 5, 7, 9; 348/745, 806
   See application file for complete search history.

(56) References Cited

U.S. PATENT DOCUMENTS

| | | | |
|---|---|---|---|
| 2008/0309884 A1* | 12/2008 | O'Dor et al. | 353/7 |
| 2009/0161028 A1* | 6/2009 | Tanaka et al. | 348/750 |
| 2011/0024231 A1* | 2/2011 | Wurth et al. | 182/113 |
| 2012/0050698 A1* | 3/2012 | Kotani | 353/94 |
| 2013/0265551 A1* | 10/2013 | Yamano et al. | 353/30 |
| 2013/0321781 A1* | 12/2013 | Aruga et al. | 353/94 |
| 2014/0055449 A1 | 2/2014 | O'Dor et al. | |
| 2014/0111536 A1* | 4/2014 | Shinozaki | 345/589 |

FOREIGN PATENT DOCUMENTS

| | | |
|---|---|---|
| CN | 101180873 A | 5/2008 |
| JP | A-2001-067015 | 3/2001 |
| JP | A-2006-019869 | 1/2006 |
| JP | A-2006-352203 | 12/2006 |
| JP | A-2011-029727 | 2/2011 |
| JP | A-2012-047849 | 3/2012 |

* cited by examiner

*Primary Examiner* — William C Dowling
(74) *Attorney, Agent, or Firm* — Oliff PLC

(57) ABSTRACT

A projection system performs projection on a projection surface using a plurality of projectors including a first projector and a second projector. The projection system projects, using the first projector, a first guide in a position a predetermined amount of a margin spaced apart from a border of a projection region where an image is projected and projects, using the second projector, a second guide distinguishable from the first guide.

8 Claims, 7 Drawing Sheets

PROJECTION SYSTEM AND PROJECTOR

CROSS-REFERENCE

The entire disclosure of Japanese Patent Application No. 2012-128677 filed on Jun. 6, 2012, which is hereby incorporated by reference in its entirety.

BACKGROUND

1. Technical Field

The present invention relates to a projection system and a projector that project an image on a projection surface.

2. Related Art

There has been known a projection system that projects an identical image in a stacked manner using a plurality of projectors to thereby improve the brightness of a projected image projected on a projection surface (see, for example, JP-A-2011-29727 (Patent Literature 1)). When such stack projection is performed, it is necessary to highly accurately align images projected from the respective projectors. For example, in the configuration described in Patent Literature 1, patterns of different colors are projected from the respective projectors that perform the stack projection. The colors are combined into a combined color to indicate that the projected images from the respective projectors are projected in specific projection positions. A user operates a projector referring to the combined color obtained by superimposing the patterns for position adjustment from the respective projectors and adjusts the positions of the projected images.

However, in adjusting the positions when the stack projection is performed as explained above, it may be difficult to adjust the projection positions depending on degrees of deviation of guides projected from the respective projectors before the adjustment.

SUMMARY

An advantage of some aspects of the invention is to provide a projection system that performs projection using a plurality of projectors, the projection system being capable of easily performing position adjustment by projecting, in an easily adjustable state, guides for adjusting the position of projected images of the respective projectors, and a projector included in the projection system.

An aspect of the invention is directed to a projection system that performs projection on a projection surface using a plurality of projectors including a first projector and a second projector. The projection system projects, using the first projector, a first guide in a position a predetermined amount of a margin spaced apart from a border of a projection region where an image is projected and projects, using the second projector, a second guide distinguishable from the first guide.

According to the aspect of the invention, the first guide is projected in the position the predetermined amount of the margin spaced apart from the border of the projection region and the second guide is projected to be distinguishable from the first guide. Therefore, since the first guide is located in, for example, the border of the projection region, it is possible to easily find the first guide in the projection region. Since the second guide is projected to be distinguishable from the first guide, it is possible to easily find both the first and second guides on the projection surface. Therefore, it is possible to quickly perform adjustment of projection regions and/or projection positions based on the first and second guides. Since the first guide is projected in the position the predetermined amount of the margin spaced apart from the border of the projection region, it is possible to obtain room for enlarging the first guide by the amount of the margin. For example, even when the first guide and the second guide partially overlap, it is possible to enlarge the first guide by the amount of the margin and easily perform adjustment to fit the second guide on the inner side of the first guide.

Another aspect of the invention is directed to the projection system described above, wherein the first projector includes a correcting unit configured to perform distortion correction and a projecting unit configured to project a distortion-corrected image on the projection surface, and the first projector projects the first guide in a position a predetermined amount of a margin spaced apart from a border of a maximum projectable region in a state in which the correction by the correcting unit is not performed.

According to the aspect of the invention, the first projector projects the first guide not in the projection region reduced by the distortion correction but in the position the predetermined amount of the margin spaced apart from the border of the maximum projectable region in the state in which the distortion correction is not performed. Therefore, since the projection position is adjusted with reference to substantially the entire maximum projectable region of the first projector, it is possible to more highly accurately adjust the projection position. When the distortion correction is performed after the position adjustment is performed, it is less likely that the position adjustment needs to be performed again because of the influence of the distortion correction. Therefore, it is possible to reduce a work load of the position adjustment. Further, since the first guide can be projected in a sufficient size by the first projector, it is less likely that the second guide extends further to the outer side than the first guide. Therefore, it is possible to easily find both the first and second guides on the projection surface. A user is not confused about which guide should be aligned with which guide. Therefore, it is possible to easily adjust the projection regions and/or the projection positions by, for example, reducing a projection region of the first projector.

Still another aspect of the invention is directed to the projection system described above, wherein the second projector includes a correcting unit configured to perform distortion correction and a projecting unit configured to project a distortion-corrected image on the projection surface, and the second projector projects the second guide at an edge of a projection region in a state in which the correction by the correcting unit is performed.

According to the aspect of the invention, the second projector projects the second guide at the edge of the projection region in the state in which the correction is performed, which is a projection region narrower than the maximum projectable region in the state in which the correction is not performed. Therefore, it is less likely that the second guide extends further to the outer side than the first guide. Therefore, it is possible to easily find both the first and second guides on the projection surface. A user is not confused about which guide should be aligned with which guide. Therefore, if the projection region and/or the projection position of the first projector is adjusted to align the first guide with the second guide, it is possible to easily and highly accurately perform alignment.

Yet another aspect of the invention is directed to the projection system described above, wherein the second projector operates as a receiver according to control by the first projector, and the first projector projects the first guide and controls the second projector to project the second guide.

According to the aspect of the invention, it is possible to control the second projector not to independently execute a function according to operation by a user. It is possible to prevent inconsistency or the like of an operation state between the first projector and the second projector and more easily adjust the projection regions and/or the projection positions.

Still yet another aspect of the invention is directed to the projection system described above, wherein the first or second projector projects, on the projection surface, a guidance display indicating that the second guide is fit on the inner side of the first guide on the projection surface.

According to the aspect of the invention, it is possible to urge, using the guidance display, a user to perform adjustment to fit the second guide on the inner side of the first guide. Consequently, it is possible to easily and highly accurately adjust the projection regions and/or the projection positions according to, for example, processing for reducing a projection region of the first projector to be aligned with the second guide.

Further another aspect of the invention is directed to the projection system described above, wherein the first or second projector includes an image pickup unit configured to photograph the projection surface, a determining unit configured to determine necessity of adjustment concerning the first or second guide on the basis of a photographed image of the image pickup unit, and a guiding unit configured to project, when the determining unit determines that adjustment is required, on the projection surface, a guidance display for urging a user to perform adjustment to fit the second guide on the inner side of the first guide on the projection surface.

According to the aspect of the invention, it is automatically determined whether the second guide is fit on the inner side of the first guide on the projection surface. Only when the adjustment is required, the guidance display for urging the user to perform adjustment to fit the second guide on the inner side of the first guide is projected. Therefore, since the user is urged to perform adjustment only when necessary, it is possible to attain improvement of usability.

Still further another aspect of the invention is directed to a projector that projects an image on a projection surface in cooperation with another projector. The projector projects a first guide in a position a predetermined amount of a margin spaced apart from a border of a projection region in which the image is projected and projects, on the projection surface, a guidance display for urging a user to perform adjustment to fit a second guide projected by the other projector on the inner side of the first guide.

According to the aspect of the invention, the projector projects the first guide in the position the predetermined amount of the margin spaced apart from the border of the projection region in which the image is projected and projects the guidance display for urging a user to perform adjustment to fit the second guide projected by the other projector on the inner side of the first guide. Therefore, with the projector according to the aspect of the invention, it is possible to urge the user to adjust the first guide and/or the second guide to project the second guide to be fit on the inner side of a projection region of the first guide.

According to the aspects of the invention, with the projection system that performs projection on the projection surface using the plurality of projectors including the first projector and the second projector, it is possible to project, in an easily adjustable state, a guide for adjusting the positions of projected images of the respective projectors and easily perform position adjustment.

BRIEF DESCRIPTION OF THE DRAWINGS

The invention will be described with reference to the accompanying drawings, wherein like numbers reference like elements.

FIGS. 3A and 3B are diagrams showing projection states of a first guide, wherein FIG. 3A is a diagram showing the first guide in a rendering region of a liquid crystal panel and FIG. 3B is a diagram showing the first guide on a projection surface.

FIGS. 4A and 4B are diagrams showing projection states of a second guide, wherein FIG. 4A is a diagram showing the second guide in a rendering region of a liquid crystal panel and FIG. 4B is a diagram showing the second guide on a projection surface.

FIGS. 5A and 5B are diagrams showing the first guide and the second guide projected on the projection surface, wherein FIG. 5A is a diagram showing the first guide and the second guide according to the embodiment and FIG. 5B shows a first guide and a second guide in the past.

FIGS. 7A and 7B are diagrams showing examples of a guidance display, wherein FIG. 7A is a diagram showing an example in which a tilt angle shifts and FIG. 7B is a diagram showing an example in which a setting angle in the horizontal direction shifts.

DESCRIPTION OF EXEMPLARY EMBODIMENTS

An embodiment to which the invention is applied is explained below with reference to the accompanying drawings.

Figure 1:
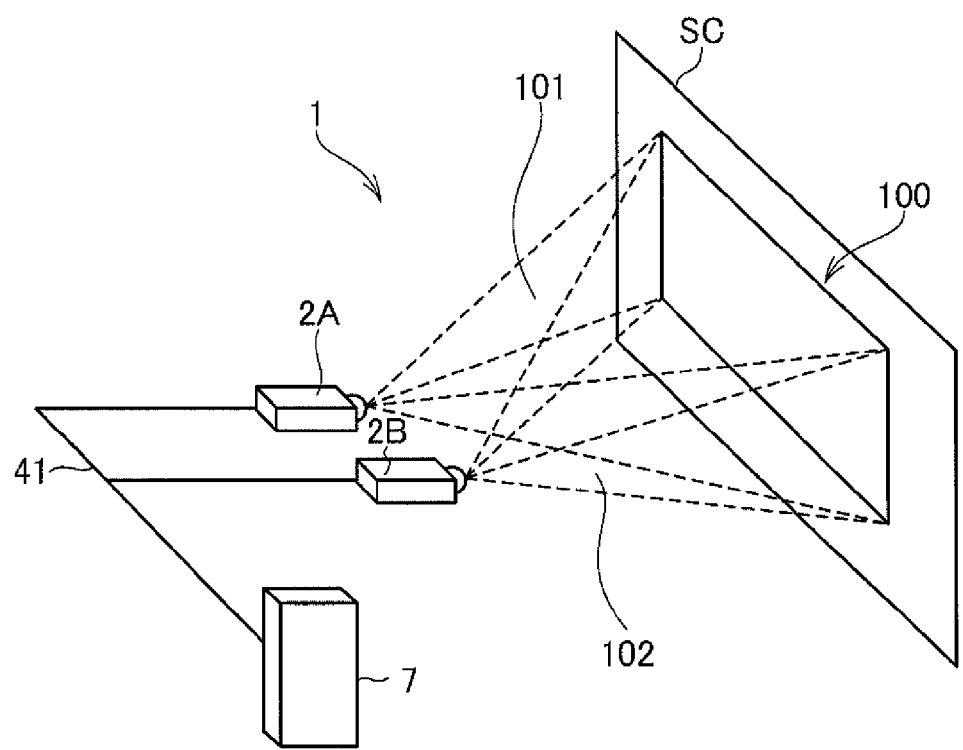
FIG. 1 is a diagram showing a schematic configuration of a projection system according to an embodiment.

FIG. 1 is a diagram showing a schematic configuration of a projection system 1 according to the embodiment of the present invention.

The projection system 1 is a projection system that performs projection using a plurality of projectors including a first projector 2A and a second projector 23. In this embodiment, the first projector 2A and the second projector 23 are set side by side. Stack display is performed to superimpose projected images 101 and 102 projected by the two projectors 2A and 23 on a screen SC (a projection surface). In FIG. 1, a configuration in which the projectors 2A and 2B are set side by side horizontally is shown as an example. The projectors 2A and 2B may be set one behind the other vertically. The projectors 2A and 2B may be set to be placed on the floor in front of the screen SC or may be set to be suspended from the ceiling.

The projectors 2A and 2B are connected to an image output apparatus 7 via an image transmission cable 41. The projectors 2A and 2B respectively project images based on image data input from the image output apparatus 7 on the screen SC. Image data concerning an identical image is supplied to the projectors 2A and 2B from the image output apparatus 7.

The projection system 1 projects the same images respectively from the projectors 2A and 23 to the screen SC. Projected images 101 and 102 are superimposed and focused on the screen SC as one projected image 100. That is, the projected image 100 is an image obtained by projecting projected lights of the respective projectors 2A and 2B to be stacked one on top of the other. There is an advantage that a light amount of the projected image 100 can be substantially increased by performing this stack display.

If the image projected by the first projector 2A and the image projected by the second projector 2B shift from each other, the projected image 100 is blurred. Therefore, it is necessary to adjust projection regions, projection positions, and projection angles of the projectors 2A and 2B.

For example, even if the projectors 2A and 2B are the same model, if the sizes of the projection regions are different, the sizes of the projected images are different. If tilt angles of the projectors 2A and 2B are different, the projected images 101 and 102 shift in the height direction. If setting angles in the horizontal direction of the projectors 2A and 2B shift, the projected images 101 and 102 shift in the lateral direction in a superimposition region 121. Therefore, it is necessary to highly accurately perform alignment of the projected images 101 and 102 by adjusting the projection regions, the projection positions, and the projection angles of the projectors 2A and 2B.

In the projection system 1 according to this embodiment, the projectors 2A and 2B have a function of projecting guides 3 (hereinafter referred to as first guide 3A and second guide 3B) for adjusting the projection regions, the projection positions, and the projection angles. The guides 3A and 3B are frame-like guides formed in a shape extending along the outer frames of the projection regions (see FIGS. 3A and 3B and FIGS. 4A and 4B). A user operates one or both of the projectors 2A and 2B referring to the two guides 3A and 3B projected on the screen SC from the projectors 2A and 2B and performs adjustment of the projected images 101 and 102. A procedure for the adjustment of the projected images 101 and 102 is explained below.

Figure 2:
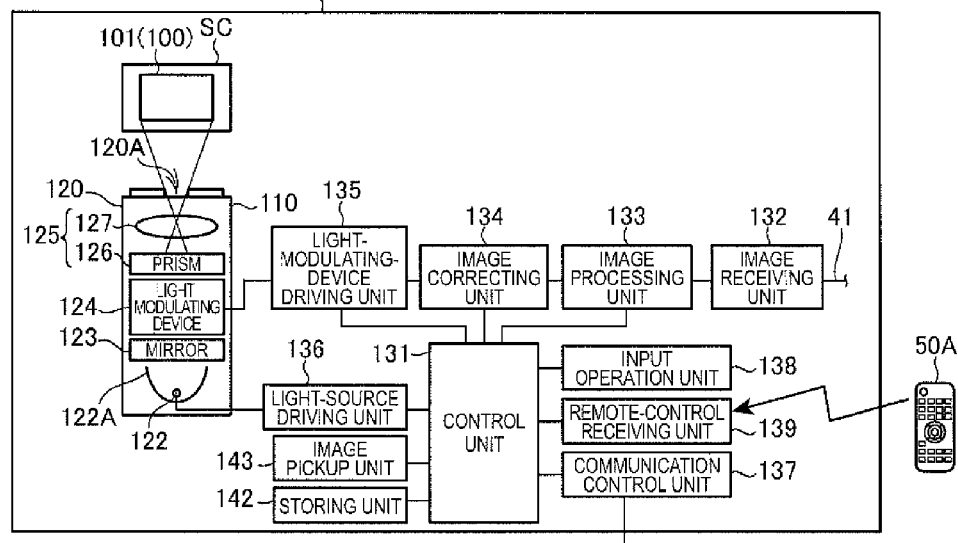
FIG. 2 is a diagram showing a functional configuration of the projection system.
Figure 2:
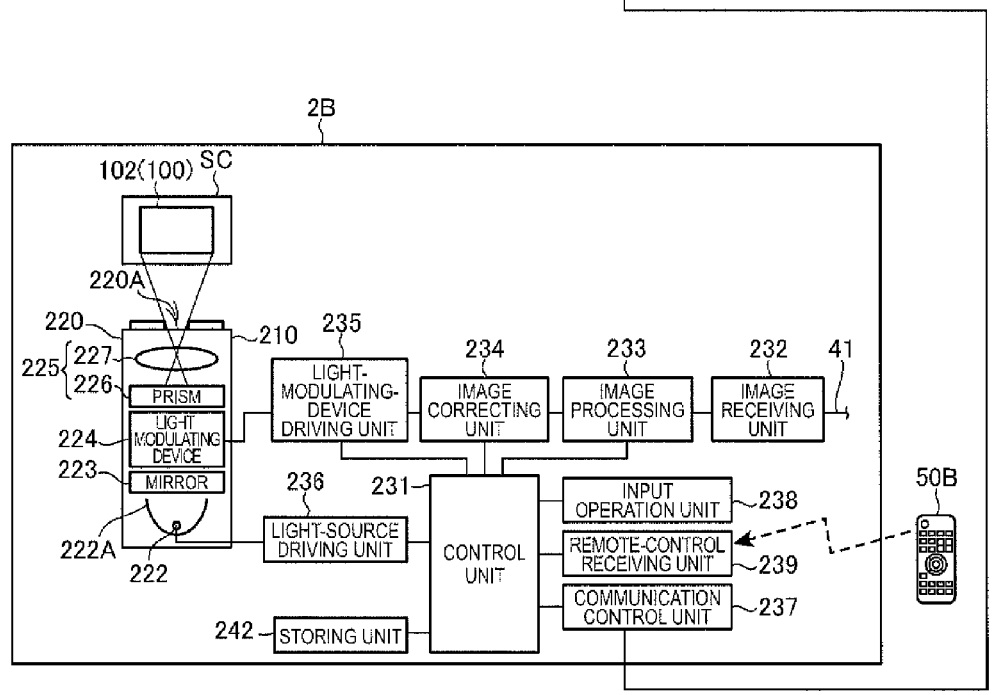

FIG. 2 is a diagram showing a functional configuration of the projection system 1. Functional configurations and hardware configurations of the projectors 2A and 2B included in the projection system 1 are schematically shown.

The first projector 2A includes, in a main body 120, an image projecting unit 110 configured to project an image, a control unit 131 configured to perform image processing and control units of the first projector 2A, an image receiving unit 132, an image processing unit 133, an image correcting unit 134, a light-modulating-device driving unit 135, a light-source driving unit 136, a communication control unit 137, an input operation unit 138, a remote-control receiving unit (an operation detecting unit) 139, a storing unit 142, and an image pickup unit 143.

The image projecting unit 110 includes a light source 122 including a reflector 122A, a mirror 123 configured to separate light emitted by the light source 122 into color lights of an R component, a G component, and a B component, a light modulating device 124 functioning as a modulating unit configured to modulate the color lights of the R component, the G component, and the B component separated by the mirror 123, and a projection optical system 125 configured to project the light modulated by the light modulating device 124 to the screen SC. In the main body 120, a cooling fan 122B functioning as a cooling unit configured to cool the light source 122 and a control substrate of the control unit 131 is provided.

As the light source 122, for example, a Xenon lamp, an extra-high pressure mercury lamp, an LED, or a laser light source can be used. The light source 122 may include, besides the reflector 122A, a lens group (not shown in the figure) for improving an optical characteristic of projected light, a sheet polarizer, and an auxiliary reflector (not shown in the figure).

The mirror 123 includes a dichroic mirror for R configured to reflect light of the R component included in the light emitted by the light source 122 and transmit lights of the G component and the B component and a dichroic mirror for G configured to reflect the light of the G component and transmit the light of the B component. A relay lens group configured to absorb a difference between optical path lengths of the R component, the G component and the B component may be provided in the mirror 123.

The light modulating device 124 is equivalent to a modulating unit configured to display an image on the screen SC. The light modulating device 124 includes a light modulating device configured to modulate the light of the R component, a light modulating device configured to modulate the light of the G component, and a light modulating device configured to modulate the light of the B component.

More specifically, the light modulating device 124 adopts a system in which three transmissive or reflective liquid crystal light valves corresponding to the colors of RGB are used or a system in which three digital mirror devices are used. The light modulating device 124 modulates the lights of the R component, the G component, and the B component separated by the mirror 123.

The mirror 123 can be configured to guide the light emitted by the light source 122 to the light modulating device 124 while keeping the light as white light without separating the light to the color lights. In this case, the light modulating device 124 adopts a DMD system in which a color wheel configured to transmit lights of RGB among lights included in the white light emitted by the light source 122 and one digital mirror device (DMD) are combined. In the system in which the color wheel and the one digital mirror device are combined, one digital mirror device is equivalent to the modulating unit.

In this embodiment, the light modulating device 124 is configured using a liquid crystal light valve. The light modulating device 124 includes a transmissive liquid crystal panel in which a plurality of pixels are arranged in a matrix shape. The light modulating device 124 functions as a modulating unit configured to form an image using the plurality of pixels and modulate the light emitted by the light source 122 using the formed image.

The light modulating device 124 is driven by the light-modulating-device driving unit 135 explained below to change the transmittance of the light in the pixels arranged in the matrix shape to thereby form an image.

The projection optical system 125 includes a prism 126 configured to combine modulated lights of the three colors of RGB modulated by the light modulating device 124 and a projection lens 127 configured to focus the projected image 100 combined by the prism 126 on the screen SC. The prism 126 is configured by combining one or a plurality of optical prisms and mirrors according to the configuration of the light modulating device 124.

The light modulating device 124 according to this embodiment includes the three transmissive liquid crystal panels. Therefore, the prism 126 is configured to combine lights modulated by the three liquid crystal panels. The projection lens 127 includes, for example, a plurality of lens groups. The projection lens 127 is driven by a driving mechanism (not shown in the figure) configured to adjust zooming and focusing. Light projected by the projection optical system 125 is projected on the screen SC from a projection window 120A. The projected image 100 is displayed on the screen SC. The light source 122, the light modulating device 124, and the projection optical system 125 function as a projecting unit of the first projector 2A.

The control unit 131 includes a not-shown CPU, a ROM having stored therein, in a nonvolatile manner, programs to be executed by the CPU, data to be processed by the CPU, and the like, and a RAM that temporarily stores programs to be executed by the CPU and data to be processed by the CPU. The control unit 131 centrally controls the units of the projector 2A.

The image transmission cable 41 is connected to the image receiving unit 132. The image receiving unit 132 receives image data (image signals) of various forms from the external image output apparatus 7 via the image transmission cable 41. The image data received by the image receiving unit 132 may be either an analog image signal or digital image data. A signal form, a data format, and the like are arbitrary. Specific specifications of a connection terminal to which the image transmission cable 41 is connected in the image receiving unit 132, the image transmission cable 41, and the image output apparatus 7 are also arbitrary. The image receiving unit 132 outputs the image data received from the image output apparatus 7 to the image processing unit 133.

The image processing unit 133 analyzes, according to the control by the control unit 131, image data input from the image receiving unit 132, performs analog/digital conversion processing, resolution conversion processing, aspect ratio changing processing, frame rate conversion processing, subtractive color processing, additive color processing, image correction processing, and the like set in advance according to a data format of the image data, and generates projected image data having resolution corresponding to the number of display pixels of the light modulating device 124.

The image correcting unit 134 executes trapezoidal distortion correction processing for correcting trapezoidal distortion caused by a tilt angle of the projector 2A with respect to the screen SC. The image correcting unit 134 executes, according to the control by the control unit 131, correction processing for correcting the projected image data output by the image processing unit 133 into a shape for compensating for trapezoidal distortion and outputs the projected image data after the correction to the light-modulating-device driving unit 135. In the correction processing, for example, an image formation region having a shape set by the user to compensate for trapezoidal distortion is set in a pixel region of the liquid crystal panel of the light modulating device 124. The projected image data is processed to fit in the image formation region. The image correcting unit 134 cooperates with the control unit 131 and functions as a correcting unit.

The light-modulating-device driving unit 135 drives the light modulating device 124 according to image data input from the image correcting unit 134. Consequently, the projected image 100 is projected in the image formation region having the shape set by the user.

The light-source driving unit 136 performs lighting control for the light source 122 on the basis of an instruction of the control unit 131.

The communication control unit 137 transmits and receives control information to and from the projector 2B. The projection system 1 includes the projector 2A as a commander configured to receive a command for controlling the units of the projection system 1. The projector 2A is configured to be capable of controlling the projector 2B by transmitting, using the communication control unit 137, a necessary command to the projector 2B that functions as a receiver.

The input operation unit 138 includes a plurality of operation keys (not shown in the figure) and the like operable by the user to give various instructions to the projector 2A. Examples of the operation keys included in the input operation unit 138 include a power key for switching ON and OFF of a power supply, a menu key for displaying a menu image for performing various kinds of setting, a decision key for deciding an item selected on the menu image or the like, a position adjustment key for instructing projection of a position adjustment pattern, four direction keys corresponding to the upward, downward, left, and right directions, and a trapezoidal distortion correction key used for trapezoidal distortion correction. The control unit 131 detects content of operation by the user in the input operation unit 138 and controls the projector 2A on the basis of the detected operation content.

The remote-control receiving unit 139 receives various instructions to the projector 2A input to a remote-controllable remote controller 50A by the user. Like the input operation unit 138, the remote controller 50A includes a plurality of operation keys such as a power key for switching ON and OFF of a power supply, a menu key for displaying a menu image for performing various kinds of setting, a decision key for deciding an item selected on the menu image or the like, a position adjustment key for instructing projection of a position adjustment pattern, four direction keys corresponding to the upward, downward, left, and right directions, and a trapezoidal distortion correction key used for trapezoidal distortion correction.

The remote-control receiving unit 139 and the remote controller 50A are respectively configured to be capable of setting reception and transmission channels. When channels of the remote-control receiving unit 139 and channels of the remote controller 50A are set to the same channels, the remote-control receiving unit 139 can receive operation by the user input to the remote controller 50A. When the projector 2B is set in the vicinity of the projector 2A and channels of a remote controller 50B for operating the projector 2B are set to channels different from the channels of the remote-control receiving unit 139, the projector 2A can be prevented from being actuated by the remote controller 50B.

The storing unit 142 includes a nonvolatile storage device such as a mask ROM (Read Only Memory), a flash memory, or an FeRAM (Ferroelectric RAM; ferroelectric memory). In the storing unit 142, in order to display, in a stacked manner, images projected from the projectors 2A and 2B, a plurality of guides 3 used in adjusting and aligning projection regions and/or projection positions of the images are stored in advance.

As shown in FIG. 1, when the projection regions and/or the projection positions are adjusted, the plurality of projectors 2A and 2B included in the projection system 1 project the guides 3A and 3B different from each other. The projectors 2A and 2B may respectively store the plurality of guides 3A and 3B. Alternatively, one projector, for example, the first projector 2A may store the plurality of guides 3A and 3B.

When the projectors 2A and 2B respectively store the plurality of guides 3A and 3B, for example, the first projector 2A may be configured to control the projectors 2A and 2B to respectively project the different guides 3A and 3B. For example, the second projector 2B may be configured to identify the first guide 3A projected from the first projector 2A and project the second guide 3B different from the first guide 3A. Further, the first projector 2A may be configured to store the plurality of guides 3A and 3B, transmit, to the second projector 2B, the second guide 3B different from the first guide 3A projected from the first projector 2A, and cause the second projector 2B to project the second guide 3B.

The image pickup unit 143 is a digital camera configured to photograph, according to the control by the control unit 131, a range in which the first projector 2A projects the projected image 101 on the screen SC and output a photographed image to the control unit 131. The image pickup unit 143 is not limited to a camera included in the main body 120 of the first projector 2A and may be a camera connected to the projector 2A using a communication line such as wire or wireless communication line.

The second projector 23 includes, in a main body 220, an image projecting unit 210 configured to project an image, a control unit (a determining unit or a control unit) 231 configured to perform image processing and control units of the second projector 2B, an image receiving unit 232, an image processing unit 233, an image correcting unit 234, a light-modulating-device driving unit 235, a light-source driving unit 236, a communication control unit 237, an input operation unit 238, a remote-control receiving unit (an operation detecting unit) 239, and a storing unit 242. Although not shown in the figure, the second projector 2B may include an image pickup unit configured to photograph a range that can cover a projection range of the second projector 2B. The configurations of the units of the second projector 2B are the same as the configurations of the units of the first projector 2A. Explanation of the configurations of the units of the second projector 2B is omitted. That is, the image projecting unit 210 is configured the same as the image projecting unit 110, the image receiving unit 232 is configured the same as the image receiving unit 132, the image processing unit 233 is configured the same as the image processing unit 133, the image correcting unit 234 is configured the same as the image correcting unit 134, the light-modulating-device driving unit 235 is configured the same as the light-modulating-device driving unit 135, the light-source driving unit 236 is configured the same as the light-source driving unit 136, the communication control unit 237 is configured the same as the communication control unit 137, the input operation unit 238 is configured the same as the input operation unit 138, the remote-control receiving unit 239 is configured the same as the remote-control receiving unit 139, and the storing unit 242 is configured the same as the storing unit 142.

The second projector 2B operates as a receiver configured to receive a control command from the first projector 2A using the communication control unit 237. When the second projector 23 independently performs projection, the second projector 2B executes various functions according to operation detected by the input operation unit 238 and operation by the remote controller 50B received via the remote-control receiving unit 239. When the second projector 2B operates as the receiver of the first projector 2A that functions as the commander, the second projector 2B operates in a sub-operation mode. In the sub-operation mode, the second projector 2B does not respond to operation by the user detected by the input operation unit 238 and operation by the user detected by the remote-control receiving unit 239. That is, when the user operates the first projector 2A and the first projector 2A outputs a command according to the operation, the second projector 2B in the sub-mode operation operates according to the command.

When the two projectors 2A and 2B are arranged close to each other, both the two projectors 2A and 2B receive infrared signals transmitted by the remote controllers 50A and 50B, i.e., interference could occur. In order to prevent the interference, for example, it is possible to adopt a configuration in which different channels are respectively allocated to the two projectors 2A and 2B and the two remote controllers 50A and 50B and one projector detects only an infrared signal emitted by one remote controller. For example, when a channel 1 is allocated to the remote controller 50A and the first projector 2A and a channel 2 is allocated to the remote controller 508 and the second projector 28, the first projector 2A reacts to only operation of the remote controller 50A and the second projector 2B reacts to only operation of the remote controller 50B. In this configuration, when the second projector 2B operates in the sub-operation mode, the second projector 2B does not respond to operation of the remote controller 50B.

Figure 3A:
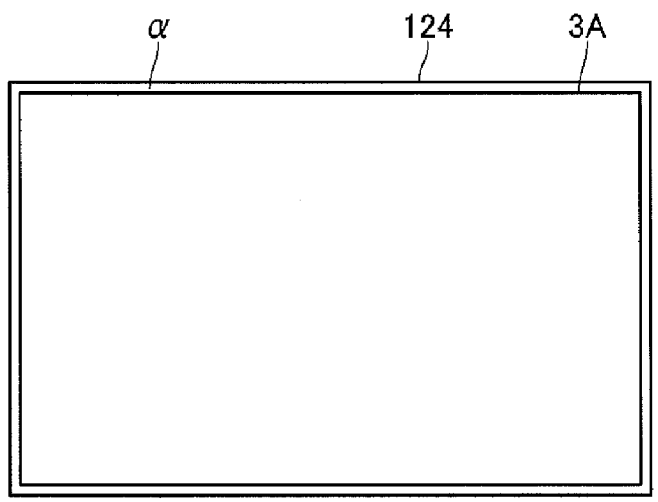
Figure 3B:
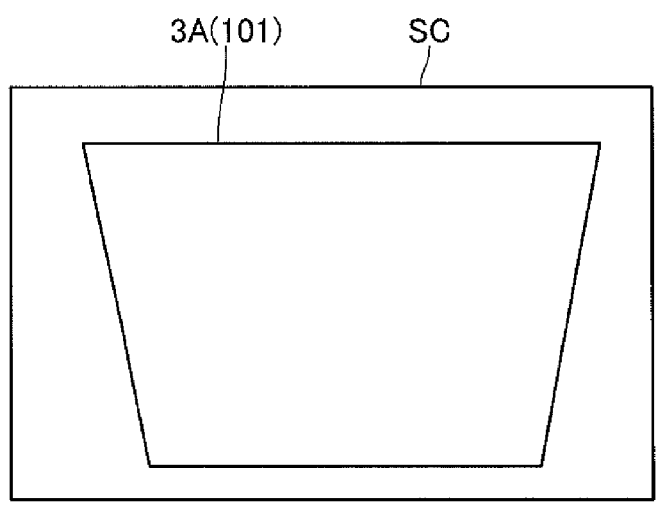

FIGS. 3A and 3B are diagrams showing the first guide 3A projected by the first projector 2A. FIG. 3A is a diagram showing the first guide 3A on a rendering region of the liquid crystal panel of the light modulating device 124. FIG. 38 is a diagram showing the first guide 3A projected on the screen SC. As shown in FIG. 3A, the first projector 2A forms the first guide 3A on the liquid crystal panel of the light modulating device 124 under the control by the control unit 131. When information concerning correction for correcting distortion of a projected image such as trapezoidal distortion correction is stored in advance, the first projector 2A releases the correction information and forms the first guide 3A in a position a predetermined amount of a margin a spaced apart from a border of a maximum rendering region of the liquid crystal panel. As shown in FIG. 3B, the first guide 3A formed on the liquid crystal panel of the light modulating device 124 is projected on the screen SC. The first guide 3A is projected on the screen SC in a position a predetermined amount of a margin spaced apart from a border of a maximum projectable region in a state in which distortion correction such as trapezoidal distortion correction is not performed. Since the first guide 3A is projected in the state in which distortion correction such as trapezoidal distortion correction is not performed, the first guide 3A may be displayed on the screen SC in a distorted state following a setting state of the first projector 2A.

Figure 4A:
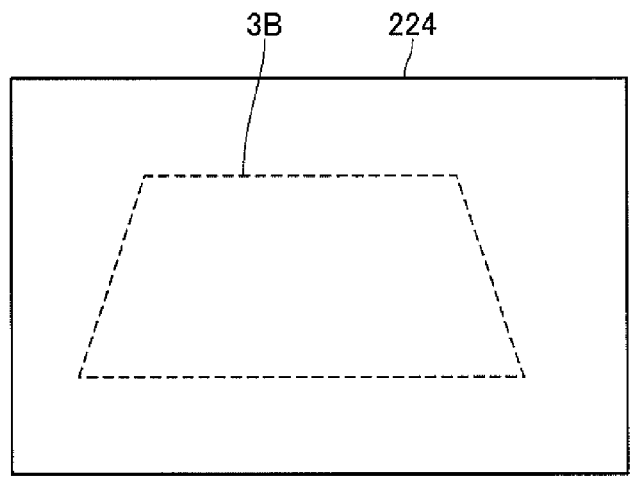
Figure 4B:
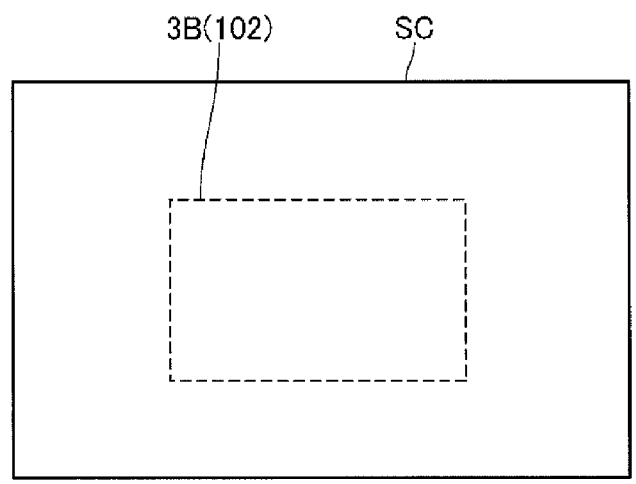

FIGS. 4A and 43 are diagrams showing the second guide 3B projected by the second projector 2B. FIG. 4A is a diagram showing the second guide 3B on a rendering region of the liquid crystal panel of the light modulating device 224. FIG. 4B is a diagram showing the second guide 33 projected on the screen SC.

The second guide 3B is projected to be distinguishable from the first guide 3A. That is, on the screen SC, the first guide 3A and the second guide 3B are projected in forms distinguishable by visual observation. In examples shown in FIGS. 3A and 3B and FIGS. 4A and 43, the first guide 3A is projected as a solid line and the second guide 3B is projected as a broken line. However, the projection of the first guide 3A and the second guide 3B is not limited to this. For example, the first guide 3A and the second guide 3B may be projected in distinguishable different colors, for example, the first guide 3A is projected in red and the second guide 3B is projected in green. In this case, the user may be able to arbitrarily select in which colors the first guide 3A and the second guide 3B are respectively rendered.

As shown in FIG. 4A, the second projector 2B forms the second guide 3B on the liquid crystal panel of the light modulating device 224 under the control by the control unit 231. The second guide 3B is formed along the outer edge of a projection region in a state in which distortion correction is performed by a function of correcting distortion of a projected image such as trapezoidal distortion correction. Consequently, the second guide 3B is formed in a trapezoidal shape on the liquid crystal panel of the light modulating device 224 following a setting state of the second projector 2B. The second guide 3B is projected in a state in which distortion correction such as trapezoidal distortion correction is performed. Therefore, as shown in FIG. 4B, the second guide 3B is displayed in a substantially rectangular frame shape on the screen SC.

Figure 5A:
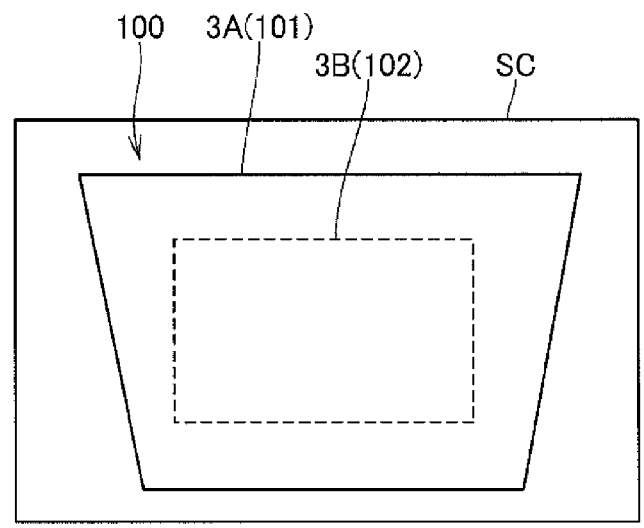
Figure 5B:
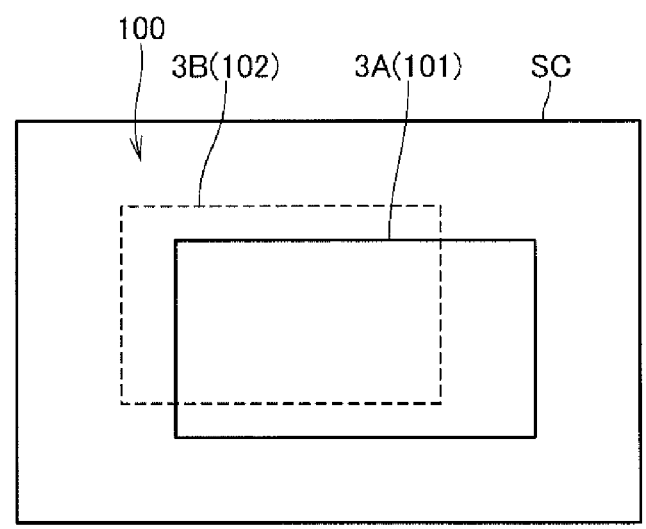

FIGS. 5A and 5B show the guides 3A and 3B projected on the screen SC. As explained above, the first projector 2A projects the first guide 3A in a position a predetermined amount of a margin spaced apart from a border of a maximum projectable region in a state in which distortion correction is not performed. Consequently, the first projector 2A can project the first guide 3A in sufficient size. Since the first guide 3A is projected in the position the predetermined amount of the margin spaced apart from the border of the maximum projectable region, it is possible to obtain room for enlarging the first guide 3A by the amount of the margin. Consequently, for example, even when the first guide 3A and the second guide 3B partially overlap, it is possible to enlarge the first guide 3A by the amount of the margin and easily perform adjustment to fit the second guide 3B on the inner side of the first guide 3A.

The second projector 2B projects the second guide 33 at an edge of a projection region in a state in which correction is performed, which is a projection region narrower than a maximum projectable region in a state in which correction is not performed. Consequently, as shown in FIG. 5A, it is less likely that the second guide 32 extends further to the outer side than the first guide 3A on the screen SC.

When the first guide 3A and the second guide 3B are respectively projected at edges of projection regions in a state in which correction is performed concerning the projectors 2A and 22, as shown in FIG. 5B, the first guide 3A and the second guide 3B are projected at edges of projection regions narrower than the maximum projectable region. When the second guide 3B is projected in a state in which a part of the second guide 32 extends further to the outer side than the first guide 3A in this way, it is difficult to determine which guide should be aligned with which guide. Therefore, it is likely that adjustment of the projection regions and/or the projection positions is difficult.

In this embodiment, the projectors 2A and 2B project the first guide 3A and the second guide 3B on the screen SC to prevent the second guide 3B from extending further to the outer side than the first guide 3A. Consequently, the user can easily find both the first and second guides 3A and 3B on the screen SC. The user is not confused about which guide should be aligned with which guide. Therefore, if the projection region and/or the projection position of the first projector 2A is adjusted to align the first guide 3A with the second guide 33, it is possible to easily and highly accurately perform alignment.

Figure 6:
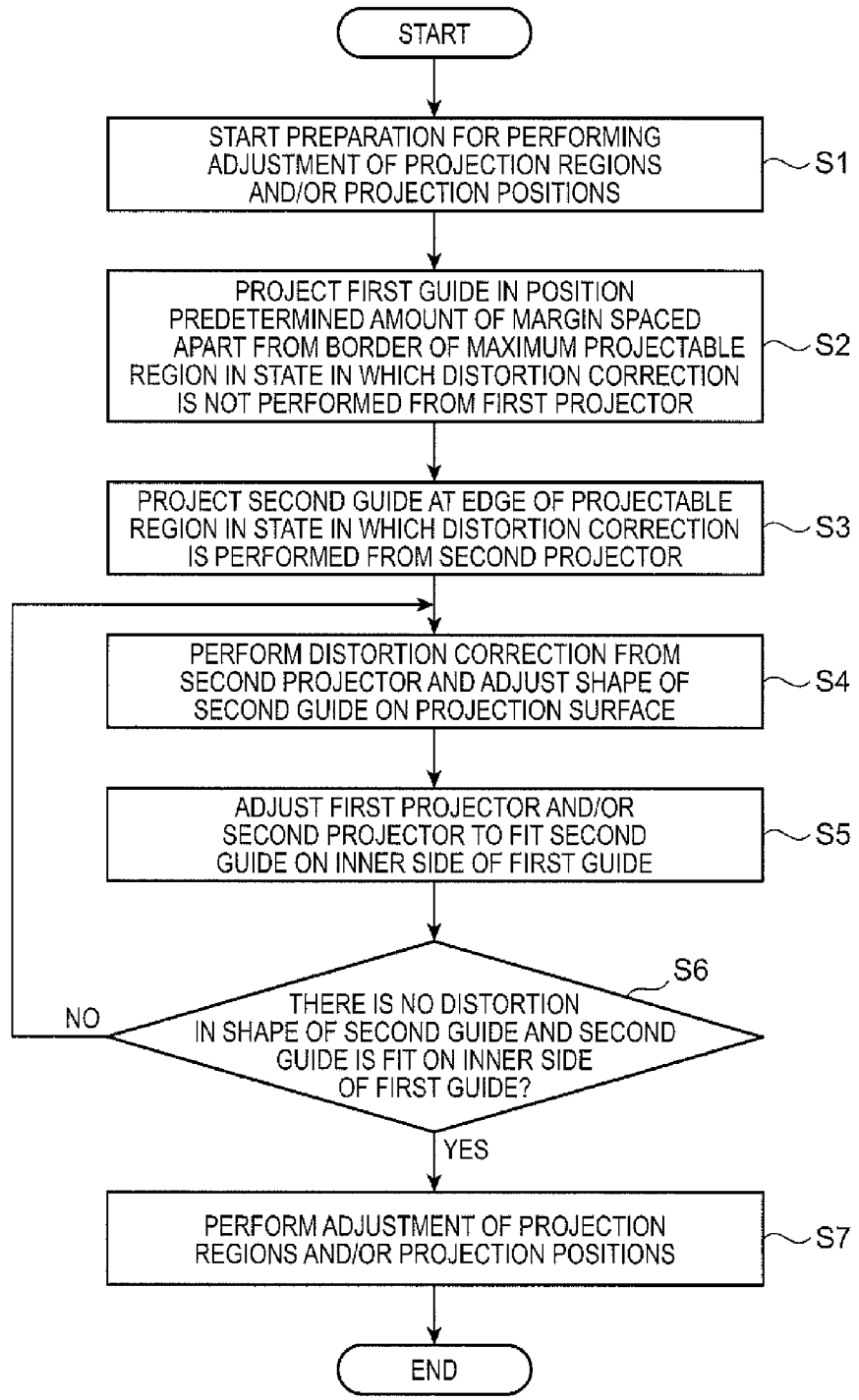
FIG. 6 is a flowchart for explaining the operation of the projection system.

FIG. 6 is a flowchart for explaining a procedure for performing adjustment of the projection regions and/or the projection positions of the projection system 1.

The procedure for performing adjustment of the projection regions and/or the projection positions of the projection system 1 is explained with reference to FIG. 6. In FIG. 6, as an example, the second projector 2B projects the second guide 3B and requests the first projector 2A to align the first guide 3A projected by the first projector 2A with the second guide 3B.

First, when operation for performing stack projection using the projectors 2A and 2B is performed by the user via the input operation unit 138, the control unit 131 starts preparation for performing adjustment of the projection regions and/or the projection positions of the projectors 2A and 2B (step S1).

Subsequently, the control unit 131 projects the first guide 3A stored in the storing unit 142 on the screen SC (step S2). As explained above, the first guide 3A is projected in the position the predetermined amount of the margin spaced apart from the border of the maximum projectable region in the state in which distortion correction is not performed. Consequently, the first guide 3A is projected on the screen SC in sufficient size.

Subsequently, the control unit 131 transmits, to the second projector 2B via the communication control unit 137, a command for causing the second projector 2B to project the second guide 3B. The second projector 23 projects the second guide 3B on the screen SC under the control by the control unit 231 (step S3). As explained above, the second guide 33 is projected at the edge of the projection region in the state in which distortion correction is performed. Consequently, the second guide 3B is projected at the edge of the projection region narrower than the maximum projectable region in the state in which correction is not performed. Therefore, it is less likely that the second guide 3B extends further to the outer side than the first guide 3A on the screen SC.

Subsequently, the control unit 131 performs, according to operation by the user, distortion correction such as trapezoidal correction for the second guide 3B projected on the screen SC to adjust the shape of the second guide 3B (step S4).

The user visually recognizes an arrangement state of the first guide 3A and the second guide 3B projected on the screen SC. When the second guide 3B is not fit on the inner side of the first guide 3A, the user adjusts the first projector 2A and/or the second projector 23 to fit the second guide 3B on the inner side of the first guide 3A (step S5).

Figure 7A:
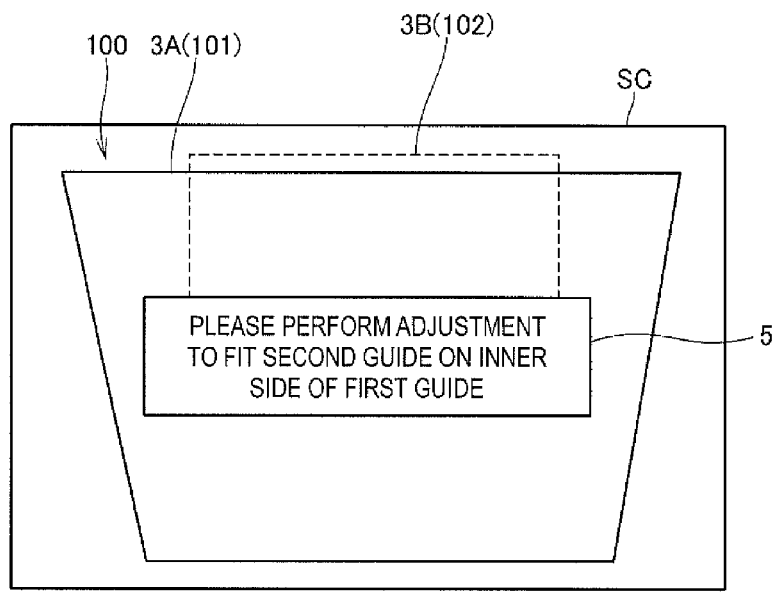
Figure 7B:
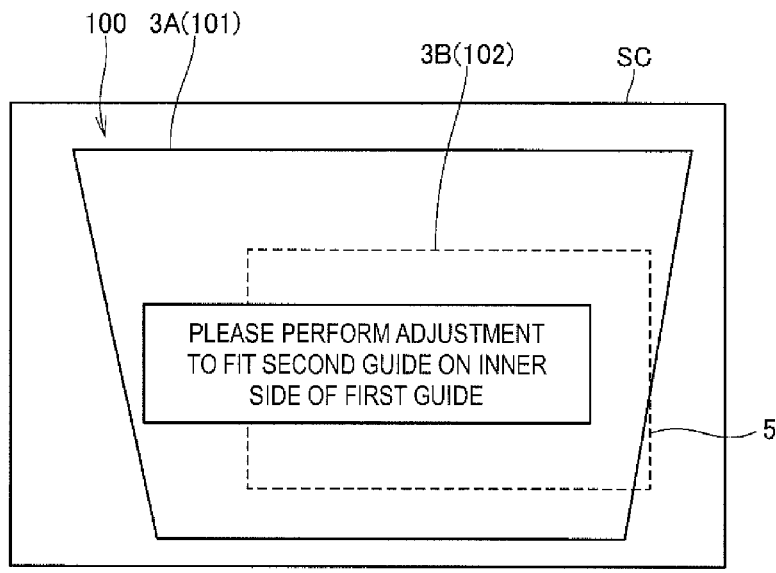

Although not shown in the flowchart, the control unit 131 may determine, on the basis of a photographed image of the screen SC photographed by the image pickup unit 143, necessity of adjustment concerning the first guide 3A or the second guide 3B. Specifically, the control unit 131 determines, on the basis of photographed image data of the image pickup unit 143, whether the second guide 3B is fit on the inner side of the first guide 3A. When the second guide 3B extends to the outer side of the first guide 3A, the control unit 131 determines that the adjustment of the first projector 2A and/or the second projector 2B is required to fit the second guide 3B on the inner side of the first guide 3A. In this way, when determining that the adjustment concerning the first guide 3A or the second guide 3B is required, as shown in FIGS. 7A and 7B, the control unit 131 projects a guidance display 5 for urging the user to adjust the first projector 2A and/or the second projector 2B on the screen SC to be superimposed on the guides 3A and 3B. The guidance display 5 is stored in the storing unit 142 in advance as a guidance image. The light-modulating-device driving unit 135 drives, on the basis of the control by the control unit 131, the light modulating device 124 according to image data stored in the storing unit 142 to project the guidance display on the screen SC. The control unit 131, the light-modulating-device driving unit 135, and the light modulating device 124 function as a guidance unit configured to project the guidance display 5 on the screen SC.

FIG. 7A is a diagram showing an example of the guidance display 5 projected when the control unit 131 determines, on the basis of the photographed image data of the image pickup unit 143, that the adjustment of the first projector 2A and/or the second projector 2B is required. The user can recognize, through the guidance display 5 projected on the screen SC, that the adjustment of the first projector 2A and/or the second projector 23 is required. The user can perform adjustment to fit the second guide 3B on the inner side of the first guide 3A by adjusting setting positions and/or angles of the first projector 2A and/or the second projector 2B on the basis of a positional relation of the guides 3A and 3B projected on the screen SC. In the example shown in FIG. 7A, the user can easily visually recognize that it is possible to move the projection position of the second guide 3B by adjusting a tilt angle of the second projector 2B and perform adjustment to fit the second guide 33 on the inner side of the first guide 3A.

The user can perform adjustment to fit the second guide 3B on the inner side of the first guide 3A by adjusting optical zooming and/or angles of the first projector 2A and/or the second projector 23. For example, in the example shown in FIG. 7B, the user can easily visually recognize that it is possible to perform adjustment to fit the second guide 3B on the inner side of the first guide 3A by adjusting the optical zooming of the second projector 2B to reduce the size of the second guide 3B or adjusting a setting angle in the horizontal direction of the second projector 2B.

It is also probable that, after the shape of the second guide 3B is adjusted in step S4, when the setting positions and/or the angles of the first projector 2A and/or the second projector 2B are adjusted in step S5, the shape of the second guide 33 is distorted. Therefore, the user visually recognizes the positional relation of the guides 3A and 3B and the shape of the second guide 33 and determines, through visual observation, necessity of adjustment of the shape of the second guide 3B and necessity of adjustment of the positions of the guides 3A and 33 (step S6). Further, when determining that the adjustment of the shape of the second guide 3B and/or the adjustment of the positions of the guides 3A and 33 is required (No in step S6), the user performs the adjustment of the shape of the second guide 3B (step S4) and/or the adjustment of the positions of the guides 3A and 3B (step S5).

The control unit 131 may be configured to perform the determination of the necessity of the adjustment of the shape of the second guide 3B and the necessity of the adjustment of the positions of the guides 3A and 33 (step S6) on the basis of the photographed image data of the image pickup unit 143. When determining that the adjustment of the shape of the second guide 33 and/or the adjustment of the positions of the guides 3A and 3B is further required, the control unit 131 may urge, through the guidance display 5, the user to perform the adjustment.

When the user determines that there is no distortion of the shape of the second guide 3B and the second guide 3B is fit on the inner side of the first guide 3A (Yes in step SE), the user performs the adjustment of the projection regions and/or the projection positions (step 37). In this way, after the shape of the second guide 3B is corrected to a shape without distortion and the second guide 3B is adjusted to fit on the inner side of the first guide 3A, the adjustment of the projection regions and/or the projection positions can be performed. Consequently, the user can easily and highly accurately perform the adjustment of the projection regions and/or the projection positions through the processing for reducing the projection region of the first projector 2A to be aligned with the projection region of the second projector 2B.

As explained above, the projection system 1 according to the embodiment to which the present invention is applied is the projection system 1 that performs projection on the projection surface using the plurality of projectors including the first projector 2A and the second projector 2B. The projection system 1 projects, using the first projector 2A, the first guide 3A in the position the predetermined amount of the margin apart from the border of the projection region in which an image is projected and projects, using the second projector 2B, the second guide 3B distinguishable from the first guide 3A. Consequently, since the first guide 3A is located, for example, at the border of the projection region, it is possible to easily find the first guide 3A in the projection region. Since the second guide 3B is projected to be distinguishable from the first guide 3A, it is possible to easily find both the first and second guides 3A and 3B on the projection surface. Therefore, it is possible to quickly perform adjustment of the projection regions and/or the projection positions based on the first and second guides 3A and 333. Since the first guide 3A is projected in the position the predetermined amount of the margin spaced apart from the border of the projection region in which an image is projected, it is possible to obtain room for enlarging the first guide 3A by the amount of the margin. Consequently, for example, even when the first guide 3A and the second guide 3B partially overlap, it is possible to enlarge the first guide 3A by the amount of the margin and easily perform adjustment to fit the second guide 3A on the inner side of the first guide 3A.

The first projector 2A includes the correcting unit configured to perform distortion correction and the projecting unit configured to project a distortion-corrected image on the screen SC. The first projector 2A projects the first guide 3A in the position the predetermined amount of the margin $\alpha$ spaced apart from the border of the maximum projectable region in the state in which correction by the correcting unit is not performed. Consequently, the first projector 2A projects the first guide 3A not in the projection region reduced by the distortion correction but in the position the predetermined amount of the margin a spaced apart from the border of the maximum projectable region in the state in which the distortion correction is not performed. Therefore, since the projection position is adjusted with reference to substantially the entire maximum projectable region of the first projector 2A, it is possible to more highly accurately adjust the projection position. When the distortion correction is performed after the position adjustment is performed, it is less likely that the position adjustment needs to be performed again because of the influence of the distortion correction. Therefore, it is possible to reduce a work load of the position adjustment. Further, since the first guide 3A can be projected in a sufficient size by the first projector 2A, it is less likely that the second guide 3B extends further to the outer side than the first guide 3A. Therefore, it is possible to easily find both the first and second guides 3A and 3B on the screen SC. The user is not confused about which guide should be aligned with which guide. Therefore, it is possible to easily adjust the projection regions and/or the projection positions by, for example, reducing the projection region of the first projector 2A.

The second projector 2B includes the correcting unit configured to perform distortion correction and the projecting unit configured to project a distortion-corrected image on the projection surface. The second projector 2B projects the second guide 3B at the edge of the projection region in the state in which the correction by the correcting unit is performed. Consequently, the second projector 2B projects the second guide 3B at the edge of the projection region in the state in which the correction is performed, which is a projection region narrower than the maximum projectable region in the state in which the correction is not performed. Therefore, it is less likely that the second guide 3B extends further to the outer side than the first guide 3A. Therefore, it is possible to easily find both the first and second guides 3A and 33 on the screen SC. The user is not confused about which guide should be aligned with which guide. Therefore, if the projection region and/or the projection position of the first projector 2A is adjusted to align the first guide 3A with the second guide 3B, it is possible to easily and highly accurately perform alignment.

The second projector 2B operates as a receiver according to control by the first projector 2A. The first projector 2A projects the first guide 3A and controls the second projector 2B to project the second guide 3B. Consequently, it is possible to control the second projector 2B not to independently execute a function according to operation by the user. It is possible to prevent inconsistency or the like of an operation state between the first projector 2A and the second projector 2B and more easily adjust the projection regions and/or the projection positions.

The first or second projector 2A or 2B projects, on the screen SC, the guidance display 5 indicating that the second guide 3B is fit on the inner side of the first guide 3A on the screen SC. Consequently, it is possible to urge, using the guidance display 5, the user to perform adjustment to fit the second guide 3B on the inner side of the first guide 3A. Consequently, it is possible to easily and highly accurately adjust the projection regions and/or the projection positions according to, for example, processing for reducing the projection region of the first projector 2A to be aligned with the second guide 33.

The first or second projector 2A or 2B includes the image pickup unit 143 configured to photograph the screen SC, the control unit 131 configured to determine necessity of adjustment concerning the first or second guide 3A or 3B on the basis of a photographed image of the image pickup unit 143, and the guiding unit configured to project, when the control unit 131 determines that adjustment is required, on the screen SC, the guidance display 5 for urging the user to perform adjustment to fit the second guide 3B on the inner side of the first guide 3A on the screen SC. Consequently, it is automatically determined whether the second guide 33 is fit on the inner side of the first guide 3A on the screen SC. Only when the adjustment is required, the guidance display 5 for urging the user to perform adjustment to fit the second guide 3B on the inner side of the first guide 3A is projected. Therefore, since the user is urged to perform adjustment only when necessary, it is possible to attain improvement of usability.

The embodiment is only an example of a specific form to which the invention is applied and does not limit the invention. The invention can also be applied as a form different from the embodiment. For example, in the example explained in the embodiment, the projectors 2A and 2B and the image output apparatus 7 are connected by wire via the image transmission cable 41. However, a connection form of the projectors 2A and 2B and the external image output apparatus 7 is arbitrary. For example, the projectors 2A and 2B and the image output apparatus 7 may be connected to each other by wireless communication employing a wireless LAN, Bluetooth (registered trademark), or the like or by wired communication employing a general-purpose data communication cable such as USB, a wired LAN, or the like and transmit and receive image data each other. The projectors 2A and 2B are connected to each other by wireless communication employing a wireless LAN, Bluetooth (registered trademark), or the like or by wired communication employing a general-purpose data communication cable such as USB, a wired LAN, or the like. However, a specific connection form is arbitrary as long as control information can be transmitted and received.

The functional units of the projectors 2A and 2B shown in FIG. 2 include functional configurations realized by cooperation of hardware and software. Specific implementation modes of the functional units are not specifically limited. Besides, specific detailed configurations of the units of the projection system 1 including the projectors 2A and 2B and the image output apparatus 7 can be arbitrarily changed without departing from the spirit of the invention.

In the first guide 3A and the second guide 3B shown in FIGS. 3A and 3B and FIGS. 4A and 4B, only the frame-like guides indicating the edges of the projection regions are shown. However, patterns for focus adjustment for adjusting the focuses of the first projector 2A and the second projector 2B may be respectively displayed on the guides 3A and 3B.

What is claimed is:

1. A projection system that performs projection on a projection surface, the projection system comprising: a plurality of projectors including a first projector and a second projector, wherein the projection system: (A) projects, using the first projector, a frame-like first guide in a position such that the first guide is spaced apart from a border of a projection region where an image is projected by a predetermined amount of a margin and a guidance display urging a user to perform adjustment to fit a second guide projected by the second projector on the inner side of the first guide, and (B) projects, using the second projector, the second guide, which is distinguishable from the first guide.

2. The projection system according to claim 1, wherein the first projector includes:
  a correcting unit configured to perform distortion correction; and
  a projecting unit configured to project a distortion-corrected image on the projection surface, wherein the first projector projects the first guide in a position a predetermined amount of a margin spaced apart from a border of a maximum projectable region in a state in which the correction by the correcting unit is not performed.

3. The projection system according to claim 1, wherein the second projector includes:
  a correcting unit configured to perform distortion correction; and
  a projecting unit configured to project a distortion-corrected image on the projection surface, wherein the second projector projects the second guide at an edge of a projection region in a state in which the correction by the correcting unit is performed.

4. The projection system according to claim 1, wherein
  the second projector operates as a receiver according to control by the first projector, and
  the first projector projects the first guide and controls the second projector to project the second guide.

5. The projection system according to claim 1, wherein the first or second projector projects, on the projection surface, a guidance display indicating that the second guide is fit on the inner side of the first guide on the projection surface.

6. The projection system according to claim 1, wherein the first or second projector includes:
  an image pickup unit configured to photograph the projection surface;
  a determining unit configured to determine necessity of adjustment concerning the first or second guide on the basis of a photographed image of the image pickup unit; and
  a guiding unit configured to project, when the determining unit determines that adjustment is required, on the projection surface, the guidance display for urging the user to perform adjustment to fit the second guide on the inner side of the first guide on the projection surface.

7. A projector that projects an image on a projection surface in cooperation with another projector, wherein the projector projects a first guide in a position a predetermined amount of a margin spaced apart from a border of a projection region in which the image is projected and projects, on the projection surface, a guidance display for urging a user to perform adjustment to fit a second guide projected by the other projector on the inner side of the first guide.

8. The projector according to claim 7, comprising:
  a correcting unit configured to perform distortion correction; and
  a projecting unit configured to project a distortion-corrected image on the projection surface, wherein the projector projects the first guide in a position a predetermined amount of a margin spaced apart from a border of a maximum projectable region in a state in which the correction by the correcting unit is not performed.

* * * * *